United States Patent Office 3,139,454
Patented June 30, 1964

3,139,454
PROCESS OF PREPARING CYCLOHEPTYLAMINE BY CATALYTIC HYDROGENATION
Morris Freifelder, Waukegan, Ill., assignor to Abbott Laboratories, North Chicago, Ill., a corporation of Illinois
No Drawing. Filed Oct. 29, 1959, Ser. No. 849,447
6 Claims. (Cl. 260—563)

The present invention relates to a new and improved method for the preparation of cycloheptylamine, which is an important intermediate in the preparation of N-p-toluylsulfonyl-N'-cycloheptylurea, a pharmaceutically valuable product.

Many literature references refer to the preparation of alicyclic amines. One method deals with their preparation by reductive amination from the corresponding alicyclic ketone. A disadvantage of this method is the side reaction which leads to the corresponding alicyclic alcohol. When cycloheptanone, for example, is reductively aminated, cycloheptanol is obtained along with cyloheptylamine. Unless the amine is purified by acid extraction, the cycloheptanol will co-distill with it. Another method to prepare alicyclic amines deals with the reduction of the corresponding oxime. The preferred hydrogenation described used pressures in the range of 1000 p.s.i. in combination with Raney nickel at 60–100° C. Reduction with Raney nickel at pressures of below 500 p.s.i. leads to the formation of a considerable amount of undesirable secondary amine. The use of palladium or platinum catalysts under low pressure conditions requires several days at the usual ratio of 1% catalyst. This reaction time can only be shortened by increasing the amount of catalyst 10–40 fold. In addition, reduction of alicyclic oximes requiring high pressure conditions is very often hazardous due to the exothermicity of this reaction. When the oxime is impure, hydrogenation is often slow even at high pressure. However, when the oxime is in pure form, the reduction may be so vigorous that is easily goes out of control.

In general, low pressure catalytic reductions of alicyclic oximes with nickel or noble metal catalysts is complicated by the formation of secondary amines, e.g., the hydrogenation of cycloheptanone oxime produces dicycloheptylamine in combination with cycloheptylamine. The equilibrium can be influenced to produce mainly the primary amine by the addition of a mineral acid, such as hydrogen chloride. However, when such an acid is present in the reaction mixture, cumbersome isolation steps to obtain cycloheptylamine are required.

It is an object of this invention to provide a new and improved method for the preparation of cycloheptylamine. It is another object to provide a new and improved method for producing cycloheptylamine without obtaining dicycloheptylamine as a by-product. A further object is the provision of a new and improved method for the production of cycloheptylamine from cycloheptanone oxime without first purifying the oxime intermediate. Other objects will be apparent from the following specification and claims.

These objects are accomplished by reacting cycloheptanone with hydroxylamine in an aqueous medium, separating the oily layer containing the resulting cycloheptanone oxime, and hydrogenating this oxime at low-pressure with rhodium as catalyst. The term "low-pressure" is used in its normally accepted meaning, i.e., for pressures not requiring any particular high pressure equipment. Ordinarily, "low-pressure" is understood to include pressures up to 50 p.s.i. The rhodium catalyst referred to may be in any of its commonly used forms, i.e., it can be in form of its oxide or it may be combined with a carrier.

The hydrogenation may be performed in any ordinary hydrogenation apparatus, i.e., a Parr shaker. Obviously, equipment for high pressure hydrogenation may also be used.

The hydrogenation of the oxime is carried out at a temperature between 0–100° C., preferably at or around room temperature. The most economical pressure range for this reaction is from slightly above atmospheric pressure to a hydrogen pressure of 50 p.s.i. Of course, higher pressures may be used, if high pressure equipment is available, but no particular advantage is seen in increasing this pressure. The oxime may be hydrogenated in an inert solvent or in the absence of any solvent.

The present invention is better understood by reference to the following examples which are given for the purpose of illustration and are not meant to be limitative.

*Example 1*

A solution of 4000 g. of cycloheptanone in 3500 cc. of methanol is treated in a 100 liter stainless steel tank with 3000 g. of hydroxylamine in 3500 cc. of water. The mixture is stirred for one hour while heating it to 80° C. A solution of 1560 g. of sodium hydroxide in 3500 cc. of water is then added slowly to the stirred solution at 80° over a 4 hour period. Stirring is continued for another hour after the complete addition of the caustic solution and the mixture is then allowed to cool to room temperature. The oily top layer containing the cycloheptanone oxime is withdrawn and dried over sodium sulfate. The liquid is filtered and taken up in 9000 cc. of methanol followed by the addition of 450 g. of 5% rhodium catalyst on alumina (22.5 g. rhodium or 0.49% by weight). This mixture is hydrogenated in a 100 liter vessel at a hydrogen pressure of 10 p.s.i. After hydrogenating for 10 hours, the reaction is completed and the mixture is filtered. The filter-cake containing primarily the catalyst is washed with 1000–2000 cc. of methanol and the wash liquid is combined with the previous filtrate. The combined filtrates are placed in a still and the solvent is distilled off. The remaining liquid is dried over sodium sulfate, filtered, and distilled. A yield of 3180 g. of cycloheptylamine is obtained which corresponds with an over-all yield of 80% of theory based on cycloheptanone. The cycloheptylamine has a boiling point of 160–170° C. and a refractive index at 25° C. of −1.4684.

*Example 2*

A solution of 25.4 g. (0.2 mole) of cycloheptanone oxime in 50 cc. of methanol is hydrogenated under 40 p.s.i. hydrogen pressure in the presence of 2.5 g. of a catalyst consisting of 5% rhodium and 95% alumina (0.49% rhodium based on the weight of cycloheptanone). After hydrogenating this solution for 6 hours at room temperature, it is filtered, and the solvent is removed by distillation. The obtained residue of cycloheptylamine is distilled at atmospheric pressure, showing a boiling point of 165° C. and having a refractive index of −1.4685 at 25° C. The yield is 70%, but since there is no forerun and no residue remains after distilling, the yield can be considered almost quantitative, the losses being mechanical.

In a modification of this example, the amount of catalyst is doubled (1.0% rhodium) and the reaction proceeds to completion in one hour. With otherwise identical conditions, the same yield is obtained. By using only 0.25% rhodium on alumina as catalyst, the reaction time becomes excessively long.

In a further modification of this experiment, the oxime is hydrogenated without the use of a solvent. The hydrogenation is carried out overnight but only a considerably lower yield is obtained.

The above examples clearly point out the smoothness of the present invention. Due to the fact that no acid or amine is necessary to reduce the amount of dicycloheptylamine formed in the hydrogenation, the purification of cycloheptylamine is obviated and the pure product can be obtained by simple distillation. In older procedures, such distillation was only possible after over-neutralization of acids present and extraction of the cycloheptylamine from the alkaline solution obtained in this manner. Thus the present process is much more economical since it involves fewer operations and fewer chemicals for the reaction and for the isolation of the end product from chemicals present during the reaction.

The new method is also found advantageous in that no high pressure is necessary, in fact, excellent results are obtained by operating at hydrogen pressure up to 50 lbs./sq. inch. At this pressure range, high yields are obtained at reaction periods of several hours when operating at room temperature. When higher temperatures, e.g., 50° C., are employed, the reaction rate is considerably faster and the process becomes even more economical. Similarly, a faster reduction rate is observed when the catalyst is used at a higher concentration, e.g., 1% rhodium by weight of the amount of cycloheptanone oxime. A useful range for the catalyst amount has been found to be from 0.3–3.0% with the range from 0.4–1.5% being the most economical.

The present invention lends itself easily to a continuous operation in which the cycloheptanone oxime in mixture with the catalyst is fed through the hydrogenation equipment concurrently or countercurrently with the hydrogen.

A further advantage of the present invention is the reusability of the rhodium catalyst, since this catalyst can be filtered easily without the danger of ignition which often occurs with other noble metal catalysts or Raney nickel. The rhodium catalyst may consist of rhodium oxide or the rhodium may be supported by a carrier, i.e., alumina, carbon, kieselguhr, chromium or zirconium oxide, bentonite, asbestos, silica gel, etc. The catalyst may be used in form of pellets, granules, or powder. From the examples it will be apparent that the solvent used in the hydrogenation can be left out; it may also be replaced by other inert, organic liquids boiling considerably below 150° C., e.g., lower alkyl alcohols, such as methanol, propanol, etc. In the preferred method, a low boiling alcohol is used as the reaction medium. By the term "inert" is meant that the solvent does not react either with the starting material or the end product and is not affected by the hydrogen. When higher boiling solvents are used, the hydrogenation temperature may be increased to a temperature below the point where the vapor pressure of solvent and/or reactant competes with the hydrogen pressure. This vapor pressure interference, however, can be reduced by increasing the hydrogen pressure.

Although the present invention is particularly useful for operation at low pressures, there are no upper limits to the pressure that can be applied, except those dictated by the equipment used. A lower pressure limit of slightly above atmospheric pressure will be obvious to those skilled in the art.

Others may practice the invention in any of the numerous ways which will be suggested by this disclosure to one skilled in the art. All such practice of the invention is considered to be a part thereof provided it falls within the scope of the appended claims.

I claim:

1. The process of preparing cycloheptylamine comprising hydrogenating cycloheptanone oxime at low hydrogen pressures at a temperature between 0° and 100° C. in the presence of from 0.3% to 3.0% rhodium based on the amount of cycloheptanone oxime.

2. The process of claim 1 wherein said hydrogen pressure is between 25 and 50 p.s.i.

3. The process of claim 1 wherein said rhodium is used in an amount of 0.4–1.5% of the amount of cycloheptanone oxime.

4. The process of claim 1 wherein said rhodium is supported by a carrier.

5. The process of claim 1 wherein said cycloheptanone oxime is dissolved in an inert organic solvent boiling below 150°C.

6. The process of claim 5 wherein said solvent is a loweralkyl alcohol.

References Cited in the file of this patent

Adkins et al.: J.A.C.S., vol. 70, pages 695–698 (1948).
Cope et al.: J.A.C.S., vol. 75, pages 3213–3215 (1953).
Iffland et al.: J.A.C.S., vol. 76, pages 4180–4181 (1954).
Shemin et al.: J.A.C.S., vol. 60, pages 1951–1954 (1938).
Coffman et al.: J. Polymer Sci., vol. 3, pages 85–95 (1948).
Zenghelis et al.: Monatsh., vol. 72, pages 58–62 (1932).